T. ANTISELL.
FILTER FOR OILS.
No. 7,767.  Patented Nov. 12, 1850.
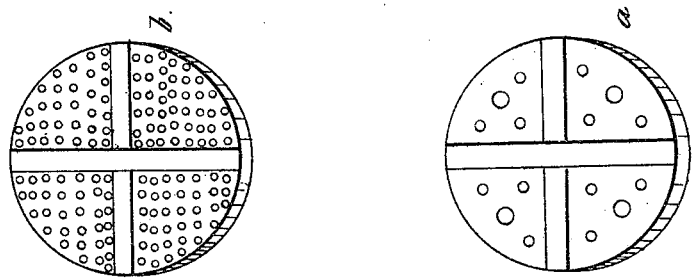
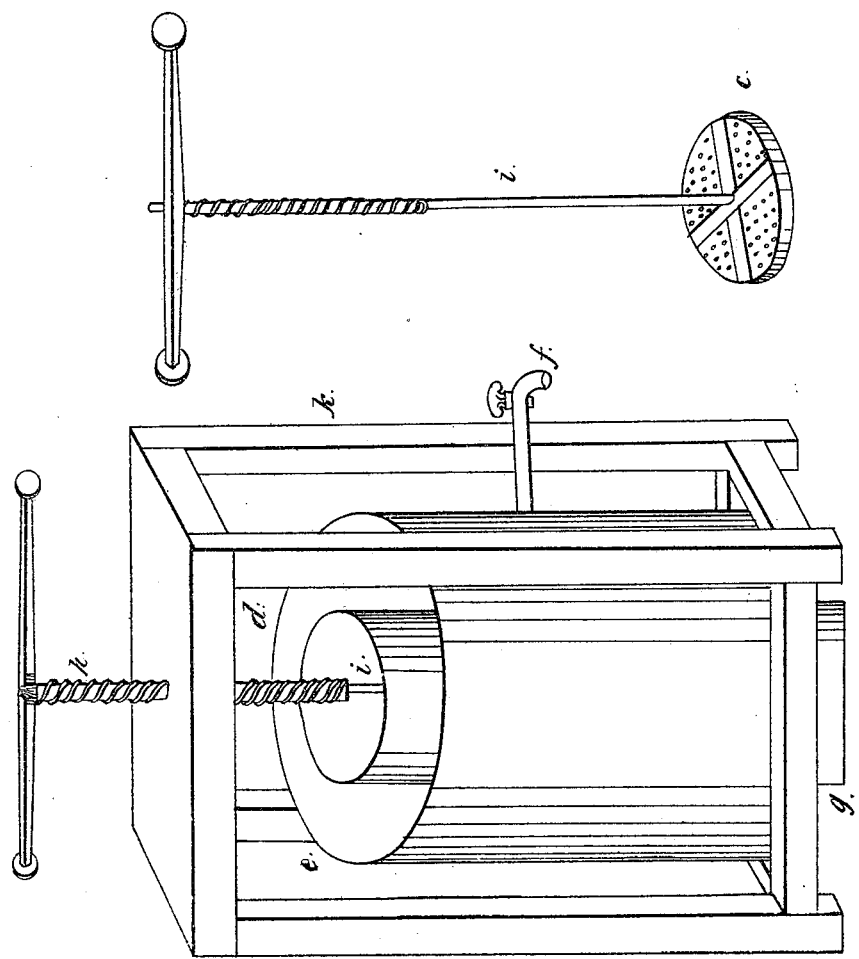

UNITED STATES PATENT OFFICE.

THOMAS ANTISELL, OF NEW YORK, N. Y.

FILTER FOR OILS.

Specification of Letters Patent No. 7,767, dated November 12, 1850.

*To all whom it may concern:*

Be it known that I, THOMAS ANTISELL, doctor in medicine, of 35 City Hall Place in the city, county, and State of New York, have invented a new mode of separating oleic acid and the more liquid parts from stearic acid and the more solid parts of oils and fatty bodies during summer temperatures; and I do hereby declare that the following is a full and exact description thereof, reference being had to the accompanying drawing and to the letters of reference marked therein.

The nature of my invention consists in the employment of a filter made as hereinafter described, by the forcible compression of which downward through the liquid to be filtered and purified, the thinner liquid is separated from the more solid parts and is made to pass upward through the filter, above which it may be drawn off by suitable arrangements. By the use of such a filter oils may be pressed in summer; oleic acid may be separated from cocoanut lard, or from saponified or acidified fats; generally, fats and palm oil may be so purified; and this apparatus may be applied where a thin liquid requires to be separated from any more solid matter diffused throughout it.

To filter oils at summer temperatures it will be necessary to congeal them previously by means of ice, ice and salt, or any of the usual chemical substances used for producing artificial cold: The stearine thus becomes solidified and may be readily pressed downward and separated.

The drawing accompanying contains the arrangement best adapted for applying the cold; this arrangement however constitutes no part of the claim, which is expressly confined to the formation and use of the filter.

To enable others skilled in the art to make and use my invention, I will proceed to describe its form and operation.

A vessel of wood or other material, of a cylindrical or other form intended for holding ice or the materials for artificial refrigeration may be used as the cooling vessel marked *e* in the drawing.

A cylindrical vessel of copper or other metal (copper is to be preferred) marked *d* in the drawing should be placed within or outside the cooling vessel (preferably within) and intended to contain the oil or material to be pressed and filtered.

The filter consists of two circular disks or plates, of wood, copper or other material of the exact diameter of the internal copper cylinder; these plates are perforated with apertures, the lower plate having apertures of larger size, as marked *a* on the drawing, while in the upper plate the apertures may be so small as to give it the resemblance of a gauze plate as marked *b* on the drawing. These two plates are kept apart by folds of cloth, flannel, hair-cloth, or other material through which the oleic acid and more fluid part of the mass may pass upward when subjected to pressure. The filter as thus arranged is marked *c* in the drawing.

A pipe with cock attached, passes from the internal copper vessel outwards and being fixed at an appropriate distance from the upper edge of the vessel, as at *f* in the drawing, draws off the oleic acid and thin oil after the crude article has been pressed.

The plates and cloth constituting the filters are attached to a rod marked *i* in the drawing upon the upper end of which is affixed a screw press arrangement, marked *h* in the drawing, which when put into action, carries the filter downward through the material, forcing the oleic acid up through the filter, and carrying the stearine and solid parts down and pressing them into a cake or mark. This mark may be afterward removed from the inner vessel by means of a false bottom attached to the under part of the copper vessel and fitting tightly on to it. The false bottom is marked *g* on the drawing.

Before subjecting the oil to pressure it should be allowed to remain some hours in the copper vessel, the outer vessel being filled during that time with ice or other material for producing cold. The stearine and more solid parts of the oil will be thus solidified and the whole rendered fit for pressure.

I do not lay claim to the congealing of oils by cold, nor to the use of a screw to exert pressure, but what I do claim as my invention, and desire to secure by Letters Patent, is The use of a filter formed as described, carried downward by pressure, under the force of which the oleic acid is filtered upward and which applied in connection with the arrangement described for applying cold, allows oils and fats to be purified in warm weather.

THOMAS ANTISELL.

Witnesses:
 W. W. SEILY,
 CHAS. F. DINNIES.